Aug. 4, 1953   A. RAPPL   2,647,558
MOTOR VEHICLE SEAT
Filed Oct. 2, 1947   5 Sheets-Sheet 1

INVENTOR
Anton Rappl
BY
Bean, Brooks, Buckley & Bean
ATTORNEYS

Aug. 4, 1953 — A. RAPPL — 2,647,558
MOTOR VEHICLE SEAT
Filed Oct. 2, 1947 — 5 Sheets-Sheet 2

INVENTOR
Anton Rappl
BY
Bean, Brooks, Buckley & Bean
ATTORNEYS

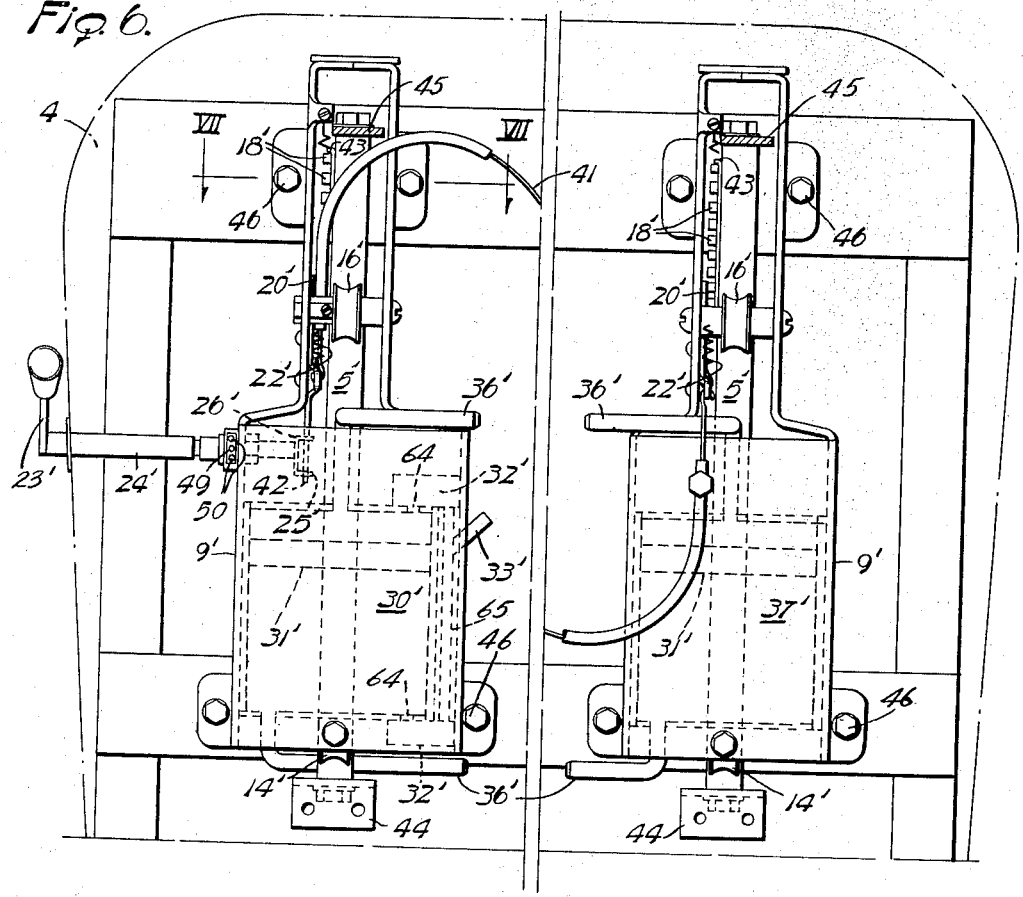
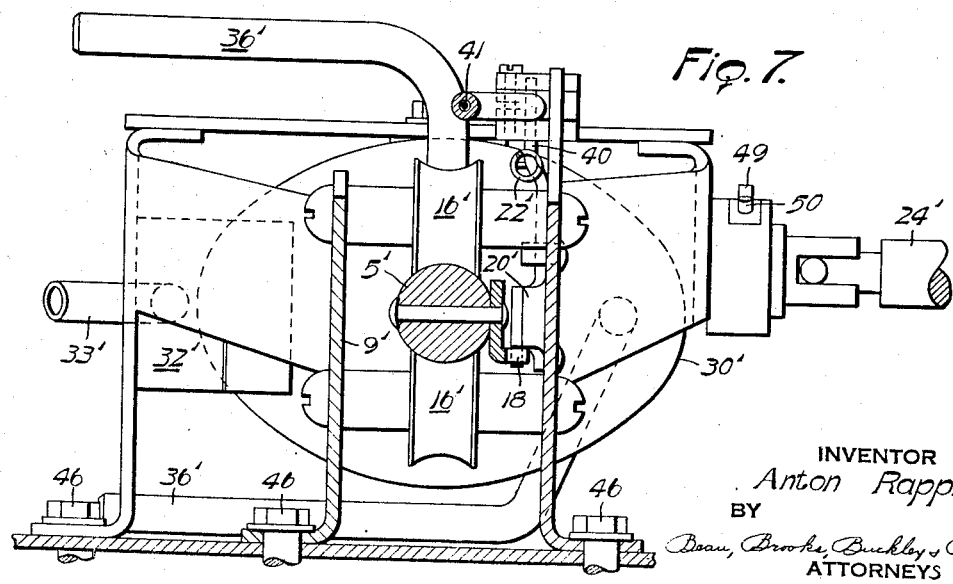

INVENTOR
Anton Rappl
BY
Bean, Brooks, Buckley & Bean.
ATTORNEYS

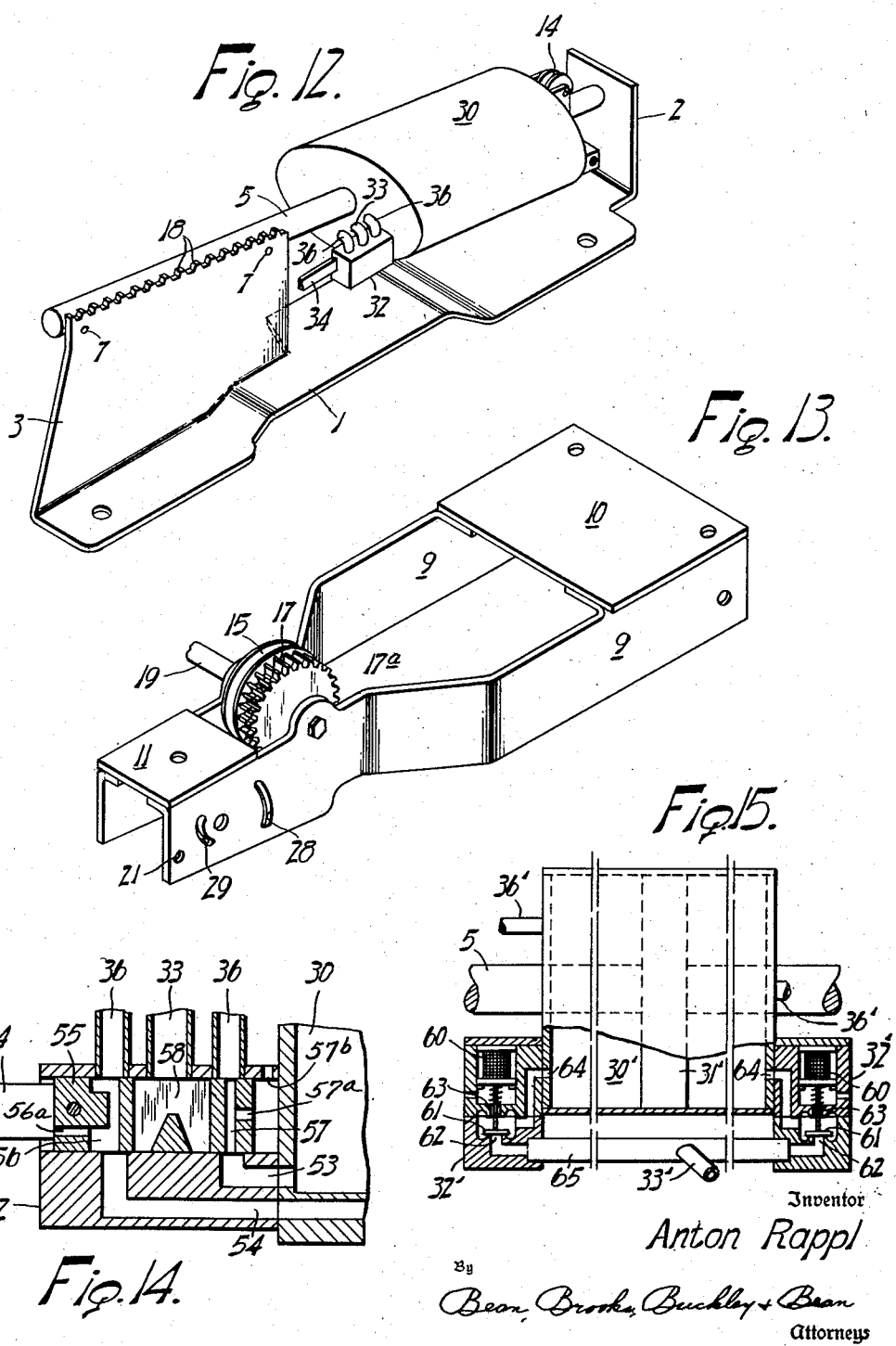

Patented Aug. 4, 1953

2,647,558

UNITED STATES PATENT OFFICE 2,647,558

MOTOR VEHICLE SEAT

Anton Rappl, Eggertsville, N. Y., assignor to Trico
Products Corporation, Buffalo, N. Y.

Application October 2, 1947, Serial No. 777,477

11 Claims. (Cl. 155—14)

This invention relates to a seat adjuster and has particular reference to a mechanism for adjusting the driver's seat of a motor vehicle.

The primary object of the invention is to provide a power actuated seat adjuster which is practical in operation and sturdy and durable in construction thereby readily adapting itself to the rugged usages to which motor vehicles are subjected. A further object of the invention is to provide a vehicle seat adjusting action which will be powered by an air pressure differential and maintained in a well directed path of movement whereby to insure the seat being supported either in an arrested position or during adjustment in a manner to avoid any binding or irregular displacement which might impair the efficiency of the mechanism as well as cause discomforture to the seat occupants. Again, the invention has for its object to provide a seat adjusting mechanism which is of simple design for facilitating its installation in the vehicle.

The foregoing and other objects will manifest themselves as the following description progresses, reference being had to the accompanying drawings, wherein Fig. 1 is a fragmentary plan view of the improved seat adjuster, with the upholstered seat removed therefrom;

Fig. 6 is a view similar to Fig. 1, but showing a modified seat adjusting mechanism;

Fig. 7 is a transverse sectional view about on line VII—VII of Fig. 6;

Fig. 12 is a perspective view of the base section of the seat adjusting unit;

Fig. 13 is a similar view of the seat carrying section of such unit;

Fig. 14 is a fragmentary view showing the control valve in section; and

Fig. 15 is a fragmentary view showing the electromagnetic valves of the modification in section.

Figure 1:
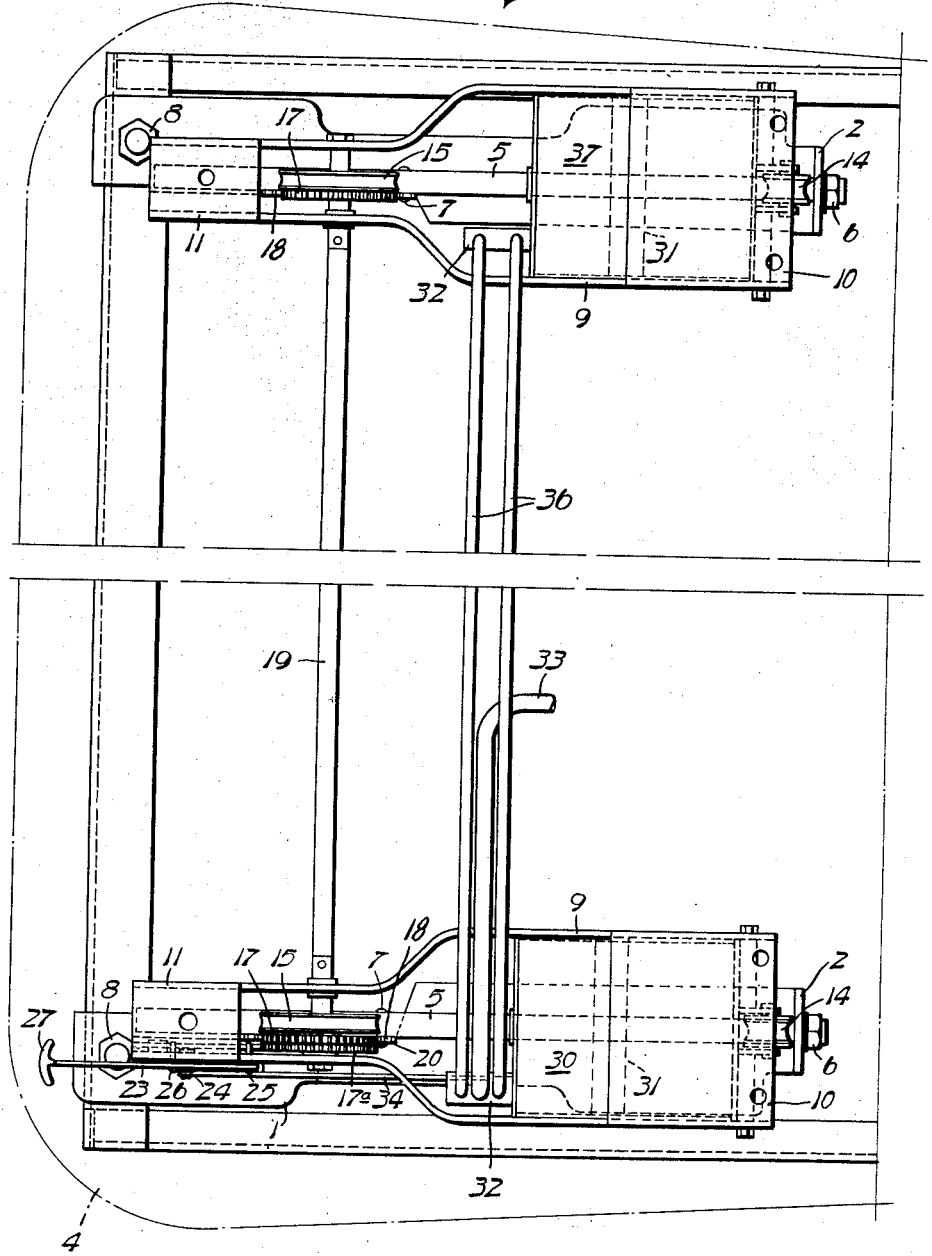
Figure 2:
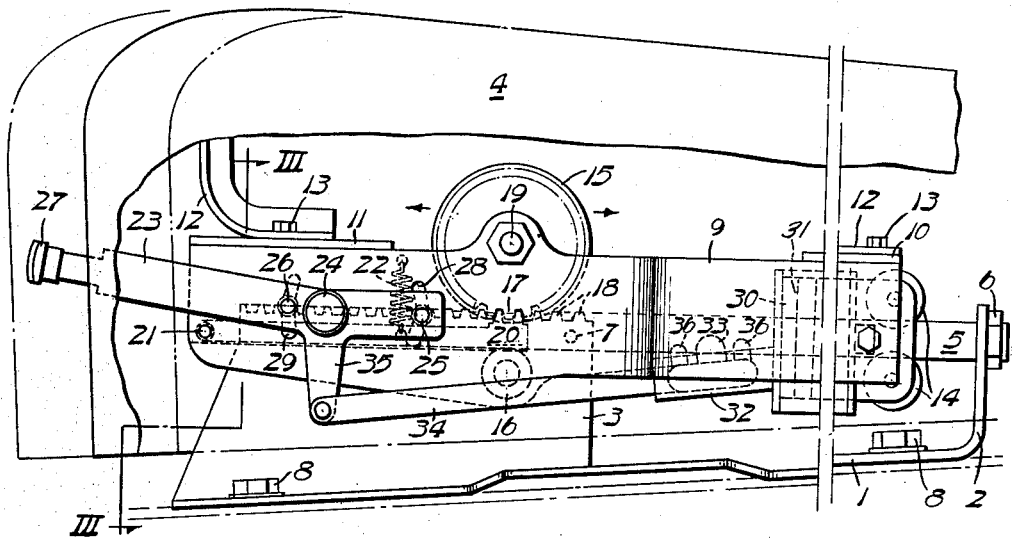
Fig. 2 is a side view of the seat adjusting action or mechanism with portions omitted.
Figure 3:
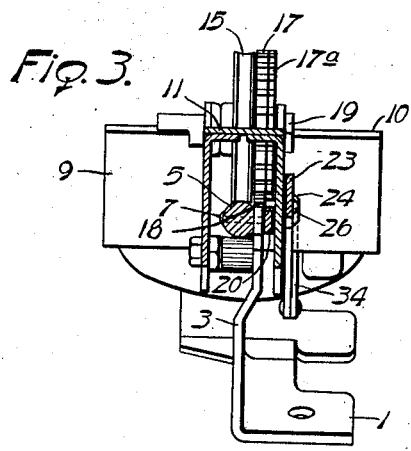
Fig. 3 is an irregular cross sectional view as taken about on line III—III in Fig. 2.
Figure 4:
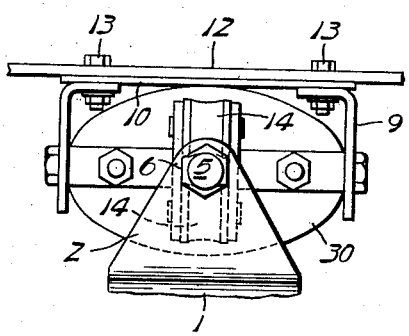
Fig. 4 is an end view of one of the seat adjusting units.
Figure 5:
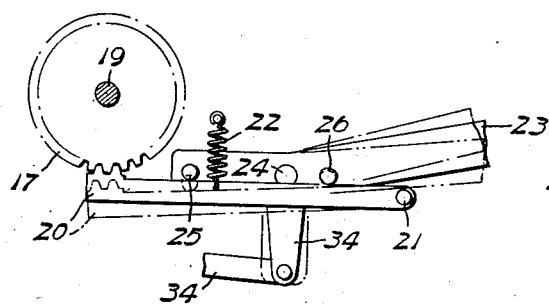
Fig. 5 is a diagrammatic view depicting the seat locking arrangement.

Referring more particularly to the drawings, and especially to Figs. 1 through 5, the seat adjuster comprises one or more motor units each capable of being installed as an independent unit and in a manner to provide a movable support for the superimposed upholstered seat. When more than one seat adjusting unit is employed, the plural units are interlocked for movement in unison. In the illustrated embodiment, two such units have been depicted, one unit being disposed under each side of the seat.

Each seat adjusting unit comprises a base section and a seat supporting section. The unit is capable of being inverted so that either section may serve as a seat supporting section while the companion section is secured to the floor of the vehicle. As viewed in Fig. 2 the base section comprises a generally U-shaped bracket 1 having a leg 2 turned upwardly from the bracket body at one end thereof and a leg 3 turned upwardly from the opposite end portion of the body in a manner to extend at right angles to the inner face of the leg 2. This disposition of the two legs enables the leg 3 to extend lengthwise of the floor bracket in the form of a flange for the desired length sufficient to provide firm support for the forward overhanging end of the seat 4, as will appear hereinafter. A track rail 5 is anchored at one end to the leg 2 by fastening means 6 and at the opposite end to the leg 3 by a suitable fastening means, such as the rivets 7. The rail 5 is thereby given substantial support, with the bracket leg 3 acting to support the rail throughout a considerable portion of its length by reason of the flange-like formation of such leg. The rigid base section thus fabricated is secured to the floor by a suitable means, such as the anchor bolts 8.

The seat carrying section is indicated by the numeral 9 and is in the form of an open frame having pads 10 and 11 at its opposite ends to which the seat frame 12 is secured, as by fasteners 13. Adjacent the rearward pad 10 the frame 9 is given anti-friction support on the rail by a pair of rollers 14 which have their peripheries conforming somewhat to the contour of the rail 5, with one roller being arranged above the rail and the companion roller tracking upon the under side of the rail to support the seat against tilting. The rail is herein shown as being substantially circular in cross section with the rollers overhanging its opposite sides to accommodate lateral thrust from the seat. Adjacent the forward pad 11 the frame 9 carries a second pair of rollers with the upper roller 15 being relatively larger than the under roller 16. The rollers 15 and 16 track along that rail portion which is coextensive with the web-like supporting leg 3 so as to provide substantial support for the overhanging forward edge of the seat when the latter is in its forwardly adjusted position.

For equalizing the seat adjusting movement the larger roller 15 may be provided with pinion teeth 17 for meshing with the rack teeth 18 alongside of the rail 5. The rack may be formed in the upper longitudinal edge of the flange 3. The larger wheel 15 is fixedly connected to the like wheel of the companion seat adjusting unit by a shaft 19 to move along as a unit upon the racks 18 to insure a purely translatory motion being imparted to the seat.

The seat may be locked in its adjusted position by a pawl or a detent 20. If desired, the teeth 17 may be formed independently of the wheel 15 and fixedly secured to the side thereof. Likewise, a separate toothed wheel 17a may be formed separately and fixedly secured to the side face of the teeth or pinion 17 for receiving the detent 20. The detent may be pivotally mounted on the frame 9 by a pin 21 and urged to its locking position by a spring 22 carried by the frame. The detent may be rendered inoperative by a lever 23 fulcruming on the frame carried pin 24 and carrying spaced cam pins 25 and 26 at opposite sides of the fulcrum pin, so that by either depressing or lifting the handle 27, one pin or the other will act upon the detent to disengage it from the wheel carried teeth. Thus the seat may be adjusted forwardly or rearwardly as desired. The cam pins may project laterally from the lever 23 through slots 28 and 29 in the frame 9.

For power adjustment of the seat, a suitable motor is carried by each frame 9. The type of motor herein illustrated is of the fluid type and is designed for operation by suction or subatmospheric pressure, such as might be derived from the intake manifold of the vehicle engine. The cylinder or chamber 30 of the fluid motor is herein illustrated as being fixed in the seat carried frame 9 adjacent or beneath the pad 10. The piston 31 is fixed to the rail 5. A valve 32 operatively connects the suction supply line 33 to one end or the other of the chamber 30 through ducts 53, 54 for securing forward or rearward adjustment of the seat. The valving member 55 and the valve body have passages 56, 56a and 57, 57a, 57b normally venting the opposite ends of the chamber 30 to the atmosphere as shown in Fig. 14, and a suction passage 58 designed to connect the supply line 33 selectively to one of the ducts 53, 54 when the valving member is reciprocated to the right or to the left respectively, as viewed in Fig. 14. When the valving member is so reciprocated, the unconnected duct will continue to have atmospheric communication, either by elongating the passage 56 to maintain the normal communication with the duct 54 or by the member 55 uncovering the duct 53. The valving member 55 is connected by a link 34 to an arm 35 on the lock or latch lever 23 and is so arranged as to open the valve to the suction line subsequent to depression of the detent 20. Where two motors are employed, one will be arranged at each end of the seat to provide an equalized application of power to the seat, and in order that both fluid motors may operate simultaneously, a pair of conduits 36 join the motor chambers of the seat supporting units in parallelism, with the forward ends of the chambers being connected by one conduit and the rearward ends connected by another conduit. Therefore, when the valve 32 is opened, as by being moved to either side of a neutral position, the two motor chambers will simultaneously respond to the fluid pressure differential and, in cooperation with the motion equalizing pinions 17, serve to impart the desired translatory movement for seat adjustment. With this arrangement the companion motor chamber 37 becomes secondary or dependent upon the primary motor chamber 30. The detent 22 cooperates with the rack through the toothed wheel. The valve 32 being common to both chambers 30 and 37, the valve passages 56, 57, 58 may communicate directly with both. When the handle is released, the spring 22 will restore the detent to its operative position to lock the seat stationary.

In the foregoing embodiment, the lock is confined directly to one motor and acts through the shaft upon the other. If desired, the lock may be applied directly to both motors, as shown in the modified embodiment of Figs. 6 through 11 wherein it will be noted that a locking dentent or pawl 20' is associated with the rack 18' of each motor and that the two lever arms 40 are interconnected by a flexible push-pull link or wire 41. Consequently, when the lever 23' is rocked in one direction or the other its cam parts 25' and 26' will accordingly function to depress the rocker arm 42 of the adjacent locking detent for disengaging the latter and indirectly acting through the flexible wire 41 to disengage the companion locking pawl whereby both motors will be simultaneously released for conjoint operation. Individual springs 22' normally hold the locking pawls 20' engaged with the teeth 18'. A stop lug 43 at one end of the rack 18' may be turned out into the path of the detent 20' for engagement thereby to limit the extent of seat adjustment.

Figure 8:
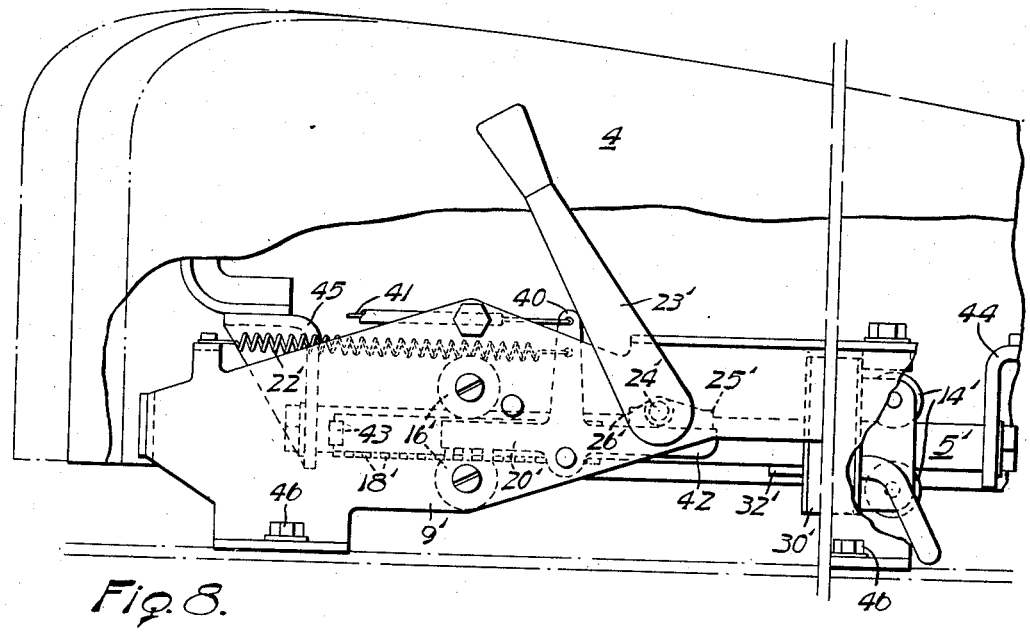
Fig. 8 is a view similar to Fig. 2 showing the modified mechanism in side elevation.
Figure 9:
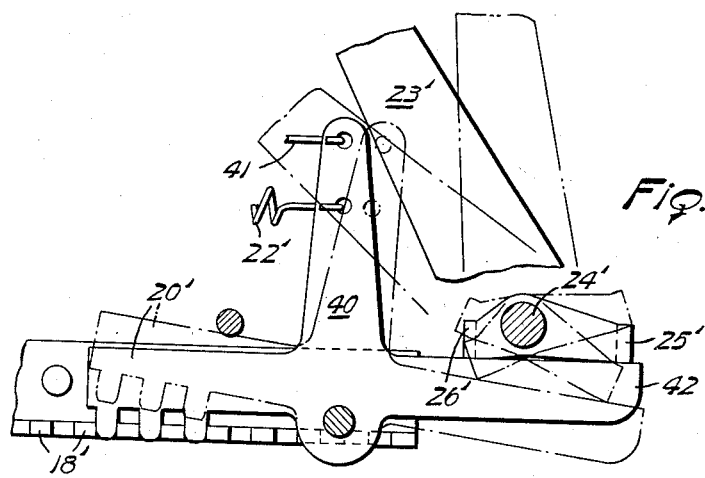
Figs. 9 and 10 are detailed views of the seat locking means of the modified form.
Figure 10:
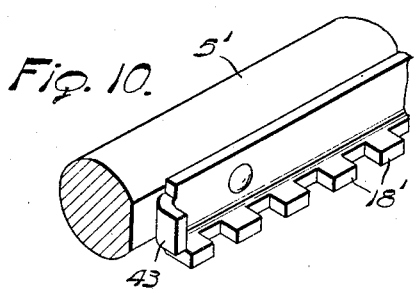
Figure 11:
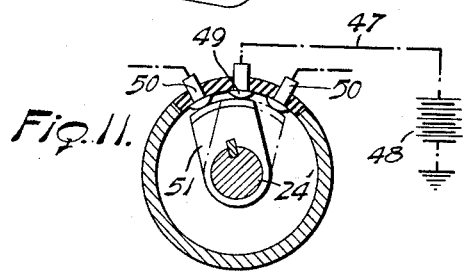
Fig. 11 is a detailed sectional view depicting the control valve switch.

In the modification the power units are inverted and the opposite ends of each rail or piston rod 5' extend through the end walls of the motor chamber in an airtight manner and are fixed to the upholstered seat 4 at their opposite ends by brackets 44 and 45, Figs. 6 and 8, while the chamber carrying frame 9' is anchored to the floor as by means of fasteners 46. The two motor chambers 30' and 37' are interconnected through the nipples 36', while the suction supply passage 33' opens into the opposite ends of the chamber 30' through a tube 65 and the respective electro-magnetic valves 32'. The pistons 31' will be fixed to the seat-carried rails 5'. Fore and aft pairs of wheels 14' and 16' are journaled in the frame 9' to provide antifriction support for the rails.

The valves 32' may be remotely controlled, as by electromagnets 60 which are connected by circuit wires 47 to a source of electrical energy 48. Arranged in the electric circuit is a control switch having a contact 49 selectively connectible to the valve contacts 50 by means of a switch arm 51 fixed on the rocker shaft 24' on which latter the lever 23' and the cam parts 25' and 26' are also fixed. Therefore, when the seat adjusting lever 23' is moved from a neutral position it will initially disengage the locking detents and thereafter close the electric circuit through the corresponding electro-magnetic valve 32' for establishing communication between the fluid motor and the source of operating pressure. Each solenoid valve has a valving member 61 normally closing the suction port 62 but attractable to an opposite position for closing an atmospheric port 63 which latter is normally open to vent the chamber 30'. Each solenoid valve opens into the adjacent end of the chamber through a passage 64.

With the dual locking detents the motion equalizing shaft may be dispensed with since the motors will operate simultaneously. In either embodiment the seat adjustment is readily effected in a practical manner by and upon simply manipulating the unlocking lever. The two parallel fluid motors acting simultaneously on opposite ends or sides of the seat serve to adjust the seat with a smooth gliding motion forwardly or rearwardly. The twin power units are simple in design and economical in production.

While the foregoing description has been given in detail, it is without though of limitation since the inventive principles involved herein are capable of assuming other physical embodiments without departing from the spirit of the invention and the scope of the appended claims.

What is claimed is:

1. A motor vehicle seat, plural power units arranged under the opposite sides of the seat for fore and aft adjustment, each unit comprising a fluid motor having a fluid chamber and a fluid responsive member, a rod connected to each fluid responsive member and extending through the opposite ends of the chamber, bracket means mounting the rod and chamber elements one on the seat and the other on the supporting vehicle structure, such bracket means supporting the rod at its opposite ends, and means operatively applying fluid pressure to the motors.

2. An adjustable motor vehicle seat supported by a power unit comprising relatively movable sections, one section having a seat-load bearing rail with a piston-like member fixed thereon intermediate its ends and the companion section having a fluid chamber receiving the piston and slidable relative to the rail axially thereof intermediate its ends, bracket means supporting one section on the other at opposite sides of the chamber, and means operatively applying fluid pressure to the chamber for effecting the movement of the chamber section relative to the rail.

3. An adjustable motor vehicle seat supported by a power unit comprising relatively movable sections, one section having a seat-load bearing rail with a piston-like member fixed thereon intermediate its ends and the companion section having a fluid chamber receiving the piston and slidable relative to the rail axially thereof intermediate its ends, bracket means supporting one section on the other at opposite sides of the chamber, said bracket means comprising rollers mounted by the chamber section above and below the rail in tracking engagement therewith whereby to operatively support the seat-load during adjustment, and means for applying an operative pressure differential to the chamber.

4. An adjustable motor vehicle seat supported by a power unit comprising relatively movable sections, one section having a seat-load bearing rail with a piston-like motor member fixed thereon intermediate its ends and the companion section having a fluid chamber receiving the piston and slidable relative to the rail axially thereof intermediate its ends, bracket means supporting one section on the other at opposite sides of the chamber, said bracket means comprising rollers mounted by the chamber section above and below the rail in tracking engagement therewith whereby to operatively support the seat-load during adjustment, a rack extending lengthwise of the rail in fixed relation thereto, a locking detent carried by the chamber section and operatively engageable with the rack for locking the seat against adjustment by the motor, and means operatively applying fluid pressure to the motor.

5. An adjustable motor vehicle seat supported by spaced power units for fore and aft adjustment, each unit comprising relatively movable sections, one section comprising a frame and a motor chamber carried by the frame, the companion section comprising a rail extending through the chamber and a piston fixed on the rail within the chamber for operation by a pressure differential, means mounting one section on the seat and the other section on the supporting vehicle structure, a rack fixedly carried by each rail, a wheel tracking along each rail and having teeth meshing with the rack for confining the seat movement to a motion of translation, and means for operatively applying fluid pressure to the motor.

6. An adjustable motor vehicle seat supported by spaced power units for fore and aft adjustment, each unit comprising relatively movable sections, one section comprising a frame and a motor chamber carried by the frame, the companion section comprising a rail extending through the chamber and a piston fixed on the rail within the chamber for operation by a pressure differential, means mounting one section on the seat and the other section on the supporting vehicle structure, a rack fixedly carried by said companion section, a wheel on each of the first specified sections tracking along each rail, the two wheels being fixedly related and having teeth meshing with the racks for confining the seat movement to one of translatory motion, and a locking detent engageable with one of the toothed wheels to lock the seat in adjustment.

7. An adjustable motor vehicle seat supported by spaced power units for fore and aft adjustment, each unit comprising relatively movable sections, one section comprising a frame and a motor chamber carried by the frame, the companion section comprising a rail extending through the chamber and a piston fixed on the rail within the chamber for operation by a pressure differential, means mounting one section on the seat and the other section on the supporting vehicle structure, a lock bar fixed on said companion section by its rail, a locking detent on said one section and associated with the lock bar, an actuator for one detent, a link connecting the two locking detents for movement in unison, and means operatively applying fluid pressure to the motors.

8. An adjustable motor vehicle seat supported by spaced power units for fore and aft adjustment, each unit comprising relatively movable sections, one section comprising a frame and a motor chamber carried by the frame, the companion section comprising a rail extending through the chamber and a piston fixed on the rail within the chamber for operation by a pressure differential, means mounting one section on the seat and the other section on the supporting vehicle structure, a lock member fixed on the companion section adjacent its rail, a locking detent associated with the lock member, a flexible link connecting the two locking detents, means operatively applying fluid pressure to the motors, and means initially actuating the detents to render them inoperative and then operating the pressure applying means to effect such seat adjustment.

9. An adjustable motor vehicle seat supported by a power unit comprising relatively movable sections, one section having a seat supporting rail with a piston-like member fixed thereon and the companion section having a frame slidable along the rail and carrying a motor chamber receiving the piston-like member, means mounting one section on the seat and the other section on the supporting vehicle structure, said one section having a body with a part turned up at one end to support the adjacent end of the rail and a second part turned up adjacent the opposite end of the rail to lie alongside of and to be secured to the rail for providing a rail supporting web extending lengthwise thereof, and means operatively applying fluid pressure to the motor for effecting movement of the frame along the rail.

10. A motor vehicle seat, plural power units arranged at opposite sides of the seat constituting the sole means of support for the seat for fore and aft adjustment, each unit comprising a fluid motor having a fluid chamber element and a piston element therein, a rod connected to each piston and having its opposite ends extending through the opposite ends of the chamber, one element connected to the seat and the other element connected to the vehicle body, and anti-friction means tracking upon the opposite ends of the rod and giving support to the seat.

11. A motor vehicle seat, power units arranged at opposite sides of the seat constituting the sole means of load support for the seat for fore and aft adjustment, each unit comprising a motor having a body section and a powered relatively reciprocating section, said reciprocating section having a rail part, one section being connected to the seat and the other section being connected to the vehicle body, spaced anti-friction means tracking upon the rail part and giving support to the seat, and a common control for both motors operable to energize the twin motors simultaneously for equalized application of power to the seat at its opposite sides to effect seat adjustment.

ANTON RAPPL.

References Cited in the file of this patent

UNITED STATES PATENTS

| Number | Name | Date |
|---|---|---|
| 1,644,528 | Huff | Oct. 4, 1927 |
| 1,693,120 | Rhyner | Nov. 27, 1928 |
| 1,700,308 | Chilson et al. | Jan. 29, 1929 |
| 2,282,761 | Richter | May 19, 1942 |
| 2,373,226 | Coates | Apr. 10, 1945 |
| 2,432,895 | Horton | Dec. 16, 1947 |

FOREIGN PATENTS

| Number | Country | Date |
|---|---|---|
| 484,313 | Germany | Oct. 15, 1929 |